3,069,697
DRAIN CLOSURE

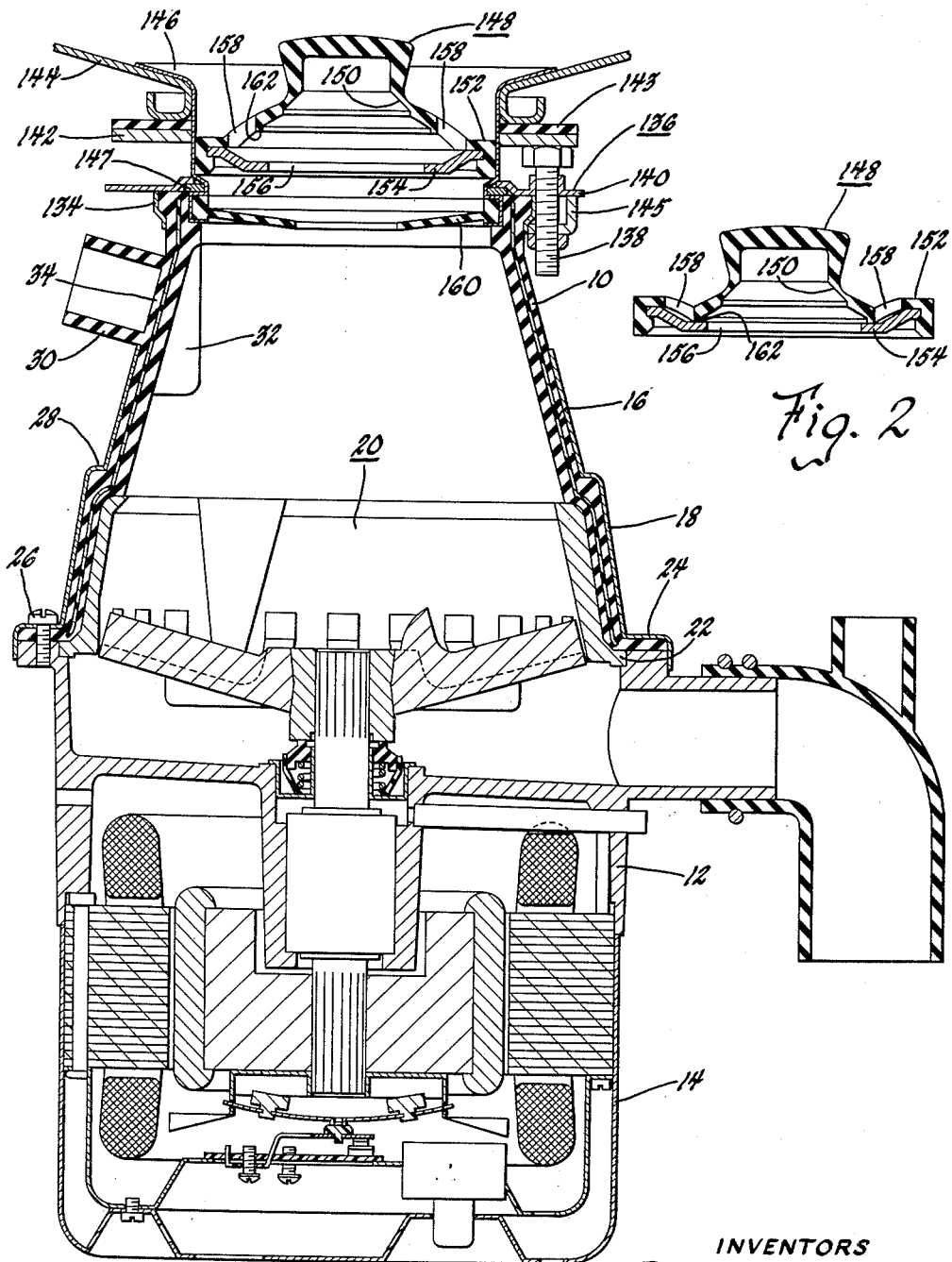

Byron L. Brucken and George B. Long, Dayton, Ohio, assignors to General Motors Corporation, Detroit, Mich., a corporation of Delaware
Original application Ser. No. 607,118, Aug. 30, 1956, now Patent No. 2,978,190, dated Apr. 4, 1961. Divided and this application Aug. 19, 1960, Ser. No. 50,621
1 Claim. (Cl. 4—287)

This is a division of our copending application S.N. 607,118 filed August 30, 1956, now Patent No. 2,978,190, issued on April 4, 1961.

This invention relates to a drain closure.

An object of this invention is to provide a closure cap that is adapted to be mounted within a sink drain member, the closure cap comprising a dome-shaped resilient portion and a rigid insert located within the dome-shape portion, the insert cooperating with the dome-shaped portion to permit or cut off the passage of fluid through the closure cap.

Further objects and advantages of the present invention will be apparent from the following description, reference being had to the accompanying drawings, wherein a preferred form of the present invention is clearly shown.

In the drawings:

FIGURE 1 is a sectional view of a garbage disposal arrangement made in accordance with this invention; and FIGURE 2 is a sectional view of the closure cap of this invention showing the closure cap in a closed position.

The garbage or waste disposer of this invention as shown in FIGURE 1 comprises an upper housing 10, and a lower impeller housing 12 to which is attached an electric motor housing 14. The upper housing 10 is preferably made of a reinforced elastomeric material. The material may be of rubber reinforced with cord 16 that may be of nylon or any other suitable reinforcing material. The upper rubber housing 10 is fixed to the impeller housing 12 by means of a stainless steel clamping ring 18 that conforms to the outer contour of the rubber housing. A shredder ring generally denoted by reference numeral 20 is held in place between the impeller housing 12 and the clamping ring 18. The shredder ring has a lower flanged portion 22 that rests on and fits within a groove formed in the impeller housing as shown. The clamping ring as shown in FIGURE 1 has an outwardly directed flanged portion 24 that overlies a portion of the rubber housing 10 and also overlies an upper portion of impeller housing 12. A plurality of bolts 26 engage tapped openings in the impeller housing to hold the clamping ring 18, the rubber housing 10 and the shredder ring 20 in fixed relationship with impeller housing 12. It should be noted that the clamping ring 18 is provided with a second flanged portion 28 that overlies a part of the rubber housing 10, and which holds the rubber housing in tight engagement with the top portion of the shredder ring 20. The clamping ring 18 extends somewhat above the top edge of the shredder ring and operates together with the reinforced rubber throat section to prevent the puncturing of the side wall of the upper housing by bones or the like that may be deposited within the garbage disposer.

The rubber housing 10 is provided with an integral conduit portion 30 that may be connected with the drain conduit of a dishwasher or the like. A pair of rubber flaps 32 one of which is shown are formed integrally with the housing 10 and are disposed at opposite sides of the intersection of conduit 30 and the housing 10. When it is desired to use the drain connection 30, the portion 34 of the rubber housing is punctured out in order to connect the conduit 30 with the interior of rubber housing 10. When the portion 34 is punched out, the rubber flaps 32 operate to prevent the passage of waste material and water from being thrown into conduit 30 as the waste material and water is thrown along the inner periphery of housing 10.

The upper portion of rubber housing 10 is provided with a metal ring 134 bonded or otherwise secured to a flanged portion of the rubber housing. The metal ring 134 and the disposal are supported by clamping means generally denoted by reference numeral 136.

The clamping means includes an annular metal ring 140 that encircles a downwardly cylindrically shaped portion of a tubular sink drain member 146. A second annular metal ring 142 encircles the lower portion of sink drain member 146 and is disposed above ring 140. A flexible sealing member 143 made of rubber or the like is interposed between the ring 142 and a flanged portion of drain member 146. A plurality of bolts 138, one of which is shown, are threaded into ring 140 with the heads o fthe bolts facing ring 142. Each bolt is provided with an L-shaped clamping member 145, the two legs of the member abutting clamp 134 and ring 142 respectively. The clamping member 145 is held in place by a nut threaded on the bolt 138 as shown. The above described connection is made by first assembling the sink drain member 146 within a drain opening in a sink. The flexible member 143 and the metal ring 142 are then slipped onto the sink drain member. The metal ring 140 carrying the bolts 138 is then slipped over the lower end of sink drain member 146. A snap ring 147 is then slipped on the member 146. The snap ring fits within a circumferentially extending inwardly bent portion of member 146 and engages the underside of ring 140 as shown. With the parts in this assembled position, the bolts 138 may be rotated and move upwardly due to the threaded connection with ring 140. In moving upwardly the bolt heads move rings 142 and 143 into tight engagement with the flanged portion of member 144 and member 144 is clamped between drain member 146 and flexible member 143. With this operation complete, the open end of housing 10 is slipped over the lowermost portion of drain member 146. The clamps 145 are then slipped onto bolts 138 and are drawn up tight against ring 134 and ring 140 by the nuts as shown. With this arrangement the disposal unit is securely fixed to the bottom of the sink.

A stopper generally denoted by reference numeral 148 is located within sink drain member 146 and has an upper handle portion and a dome-shaped portion 150 that merges into a cylindrical portion 152 which tightly engages the walls of sink drain member 146. The sink drain member 146 is provided with a circumferentially extending ledge that supports the lowermost portion of stopper 148 as shown. The stopped 148 is preferably made of an elastomeric material such as rubber and carries a stainless steel plate 154. The stainless steel plate has a central aperture 156 while the dome-shaped portion of the stopper 148 is provided with a plurality of circumferentially spaced apertures 158. When the stopper is in the position shown in FIGURE 1, water draining down into sink drain portion 146 may pass through apertures 158, aperture 156 and through a central aperture formed in rubber guard 160 and thence into the interior of rubber housing 10.

The rubber guard 160 preferably has a plurality of radially extending slits (not shown) extending outwardly from the central aperture. The outer peripheral edge of guard 160 fits within a groove formed by bending the sink drain to the shape shown in FIGURE 1. The dome-shaped portion 150 of stopper 148 is adapted to be collapsed and remain in the position shown in FIG- URE 9. In this position an annular rib 162 integral with the dome-shaped portion of the stopper engages the stainless steel plate and closes a drain path ordinarily provided by apertures 158 and aperture 156. The stopper 148 may be removed from within the sink drain portion 146 by grasping the top portion of the stopper and removing the stopper from within the sink drain. The stopper when in position in the sink drain 146 may be closed by simply pressing downwardly on the top portion of the stopper in order to collapse the dome-shaped portion and thus force the annular rib 162 against the stainless steel plate 154.

While the form of embodiment of the invention as herein disclosed constitutes a preferred form, it is to be understood that other forms might be adopted, as may come within the scope of the claims which follow.

What is claimed is as follows:

A stopper adapted to be interposed in a sink drain or the like comprising, an annular dome-shaped flexible cap member, said cap member having a fixed inner circumferentially extending slot and a dome portion generally above said slot and manually movable relative thereto, an annular substantially flat metal insert member secured to said cap member with the outer peripheral edge of said insert member embedded in said circumferentially extending slot, said dome portion having a solid annular rib spaced from said insert member and movable downwardly into abutting relationship with said insert member, means defining a central passageway in said metal insert member in axial alignment with but smaller in diameter than said solid annular rib and means defining a plurality of passageways in said dome portion radially outwardly of said rib and in alignment with a solid portion of said insert member between said outer peripheral edge and said central passageway, whereby said passageways are closed when said rib is moved downwardly into abutting relationship with said insert, said passageways defining a flow path through said stopper when said rib is moved upwardly out of abutting relationship with said insert.

References Cited in the file of this patent

UNITED STATES PATENTS

| | | |
|---|---|---|
| 1,596,893 | Schifter | Aug. 24, 1926 |
| 2,643,394 | Wood | June 30, 1953 |